(12) United States Patent
Murata et al.

(10) Patent No.: US 7,178,400 B2
(45) Date of Patent: Feb. 20, 2007

(54) PHYSICAL QUANTITY SENSOR HAVING MULTIPLE THROUGH HOLES

(75) Inventors: Minoru Murata, Okazaki (JP); Kenichi Yokoyama, Nagoya (JP); Makoto Asai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/095,469

(22) Filed: Apr. 1, 2005

(65) Prior Publication Data
US 2005/0229704 A1    Oct. 20, 2005

(30) Foreign Application Priority Data
Apr. 28, 2004  (JP)  .............................. 2004-133657
Apr. 14, 1920  (JP)  .............................. 2004-118887

(51) Int. Cl.
*G01P 15/00*  (2006.01)
*G01P 15/125* (2006.01)

(52) U.S. Cl. ................................ 73/514.29; 73/514.16; 73/514.32

(58) Field of Classification Search ............. 73/514.32, 73/514.16, 514.29, 514.36, 514.38, 504.04, 73/504.12, 504.14, 504.16
See application file for complete search history.

(56) References Cited
U.S. PATENT DOCUMENTS 5,228,341 A * 7/1993 Tsuchitani et al. ......... 73/514.36
5,350,189 A * 9/1994 Tsuchitani et al. .......... 280/735
5,983,721 A * 11/1999 Sulzberger et al. ....... 73/514.32
6,046,067 A * 4/2000 Werner ......................... 438/52
6,151,966 A * 11/2000 Sakai et al. .............. 73/514.32
6,350,189 B1 * 2/2002 Tanaka ........................ 451/326
6,450,029 B1    9/2002 Sakai et al.
6,450,033 B1    9/2002 Ito et al.
6,583,374 B2 * 6/2003 Knieser et al. ............. 200/181

FOREIGN PATENT DOCUMENTS

JP    A-2001-133268    5/2001

* cited by examiner

*Primary Examiner*—Helen C. Kwok
(74) *Attorney, Agent, or Firm*—Posz Law Group, PLC

(57) ABSTRACT

A semiconductor physical quantity sensor includes: a substrate; a semiconductor layer supported on the substrate; a trench disposed in the semiconductor layer; and a movable portion disposed in the semiconductor layer and separated from the substrate by the trench. The movable portion includes a plurality of through-holes, each of which penetrates the semiconductor layer in a thickness direction. The movable portion is capable of displacing on the basis of a physical quantity applied to the movable portion so that the physical quantity is detected by a displacement of the movable portion. The movable portion has a junction disposed among the through-holes. The junction has a trifurcate shape.

5 Claims, 13 Drawing Sheets ical Quantity Sensor Having

PHYSICAL QUANTITY SENSOR HAVING MULTIPLE THROUGH HOLES

CROSS REFERENCE TO RELATED APPLICATIONS

This application is based on Japanese Patent Applications No. 2004-118887 filed on Apr. 14, 2004, and No. 2004-133657 filed on Apr. 28, 2004, the disclosures of which are incorporated herein by reference.

FIELD OF THE INVENTION

The present invention relates to a physical quantity sensor having multiple through holes.

BACKGROUND OF THE INVENTION

A dynamic-quantity semiconductor sensor (i.e., a physical quantity sensor) of prior art comprises a base plate and a semiconductor layer. The semiconductor layer is supported on the base plate. Through trenches are made in the semiconductor layer by etching. The semiconductor layer has a movable part, which is defined by the trenches and released from the base plate. The sensor is, for example, disclosed in Japanese Patent Application Publication No. 2001-91265.

The dynamic-quantity semiconductor sensor detects the applied dynamic quantity, i.e., the physical quantity, based on the displacement of the movable part when dynamic quantity such as angular velocity or acceleration is applied to the sensor.

For example, Japanese Patent Application Publication No. 2001-133268 discloses an angular-velocity sensor which is made of an SOI (Silicon-On-Insulator) substrate consisting of two silicon plates and an oxide film, the oxide film sandwiched between the silicon plates.

The above sensors of prior art are so-called dynamic-quantity semiconductor sensors of the surface-processing type. They are made as follows. One of the two silicon plates of an SOI substrate is a supporting base plate and the other is a semiconductor layer. Trench etching is made from the top-surface side of the semiconductor layer to form the pattern of a structure including a movable part. Then, the movable part is released by removing the lower part of the semiconductor layer by side etching or removing the oxide film by sacrifice-layer etching.

Besides, a plurality of through holes is made in the movable part to raise the efficiency of etching and reduce the weight of the movable part. This is disclosed in, for example, Japanese Patent Application Publication No. 2001-99861.

The above dynamic-quantity semiconductor sensors of prior art have the following problems. In the step of releasing the movable part by etching from the through holes, the finished shapes of various parts of the movable part become considerably uneven, the characteristics of movable parts vary, and the strength of the movable part deteriorates.

SUMMARY OF THE INVENTION

In view of the above-described problem, it is an object of the present invention to provide a physical quantity sensor with multiple through holes having small manufacturing error.

A semiconductor physical quantity sensor includes: a substrate; a semiconductor layer supported on the substrate; a trench disposed in the semiconductor layer; and a movable portion disposed in the semiconductor layer and separated from the substrate by the trench. The movable portion includes a plurality of through-holes, each of which penetrates the semiconductor layer in a thickness direction. The movable portion is capable of displacing on the basis of a physical quantity applied to the movable portion so that the physical quantity is detected by a displacement of the movable portion. The movable portion has a junction disposed among the through-holes. The junction has a trifurcate shape.

In the above sensor, a distance between the periphery of the junction and the center of the junction becomes smaller comparatively. Therefore, when the movable portion is separated in a release etching process, the etching time, i.e., the process time becomes shorter so that the manufacturing deviation of the movable portion is reduced. Accordingly, the sensor has small manufacturing error.

Preferably, each through-hole has a rectangular shape, and the through-holes are arranged to be houndstooth check structure. Preferably, each through-hole has a hexagonal shape, and the through-holes are arranged to be honeycomb structure. Preferably, the movable portion provides a through-hole frame having a plurality of junctions. The frame is made of a plurality of rods having a width in a horizontal direction perpendicular to the thickness direction. The width of the rod is uniformed, and the junctions are provided by an intersection of the rods.

Further, a semiconductor physical quantity sensor includes: a substrate; a semiconductor layer supported on the substrate; a trench disposed in the semiconductor layer; and a movable portion disposed in the semiconductor layer and separated from the substrate by the trench. The movable portion includes a plurality of through-holes, each of which penetrates the semiconductor layer in a thickness direction. The movable portion is capable of displacing on the basis of a physical quantity applied to the movable portion so that the physical quantity is detected by a displacement of the movable portion. The trench adjacent to the movable portion has a width capable of performing a maximum etching rate of the semiconductor layer adjacent to the trench.

In the above sensor, the movable portion is separated from the substrate with using the trench in the movable portion and the trench disposed outer periphery of the movable portion in a release etching process when the sensor is manufactured. At this time, the trench adjacent to the movable portion has a width capable of performing a maximum etching rate of the semiconductor layer adjacent to the trench. Therefore, the movable portion can be separated from the substrate with a short etching time. Thus, the movable portion is separated accurately from the substrate in the manufacturing process. Accordingly, the sensor has small manufacturing error.

Preferably, the trench having the width capable of performing the maximum etching rate is disposed in the movable portion. Preferably, the trench further includes a second width and a third width. The trench having the second width or the third width is disposed outer periphery of the movable portion. The second width is wider than the third width. The trench having the width capable of performing the maximum etching rate in the movable portion is disposed neighboring to the trench having the second width. More preferably, the trench in the movable portion disposed neighboring to the trench having the third width is capable of performing a later etching rate later than that of the trench in the movable portion disposed neighboring to the trench having the second width.

Preferably, the etching rate and the width of the trench have a relationship in such a manner that the maximum etching rate is obtained in a case where the width of the trench is around 7 μm. More preferably, the etching rate and the width of the trench include further relationship in such a manner that the etching rate substantially becomes zero in a case where the width of the trench is equal to or larger than 10 μm.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 9:
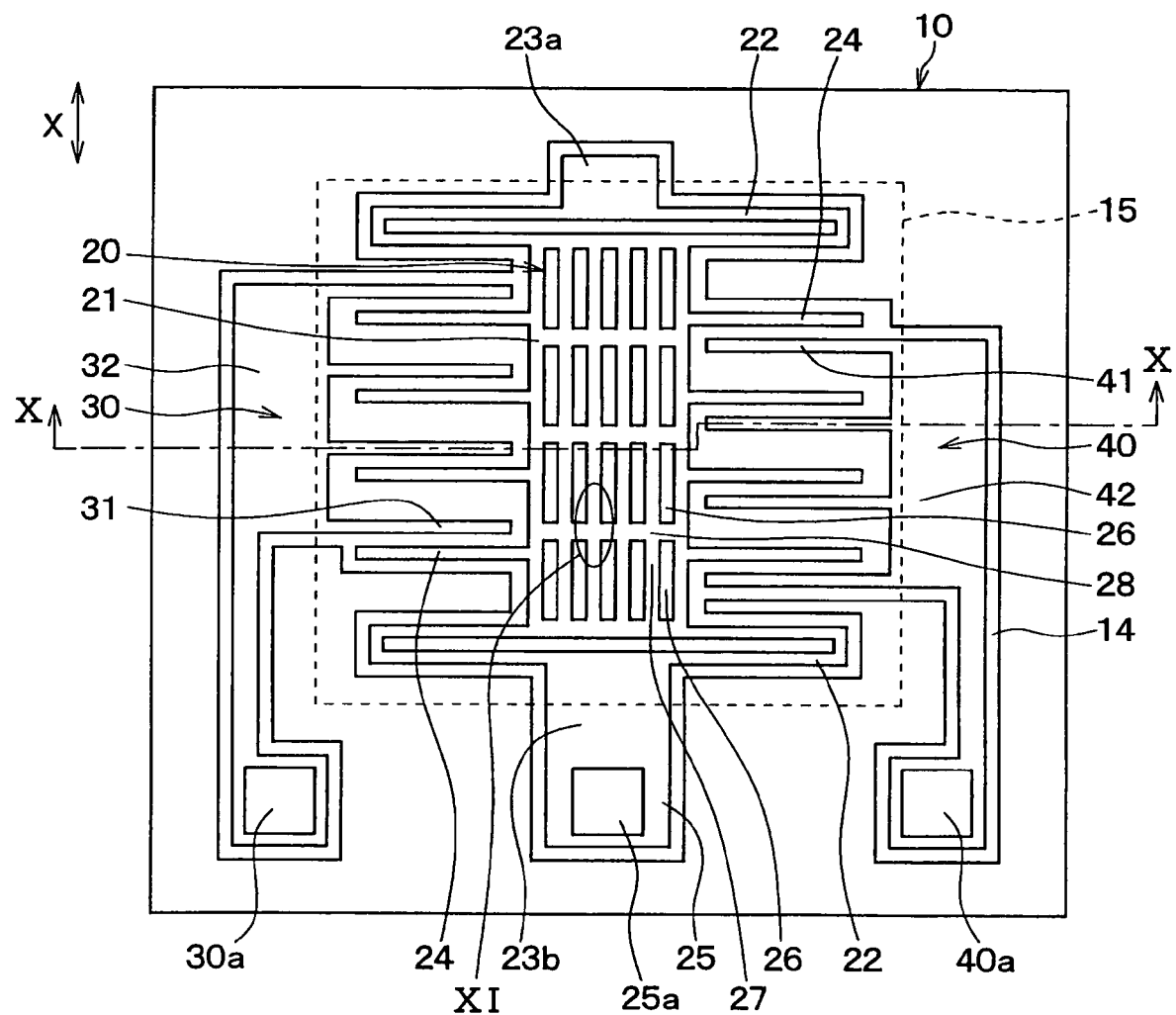
FIG. 9 is a plan view showing a semiconductor acceleration sensor according to a comparison of the first embodiment.
Figure 10:
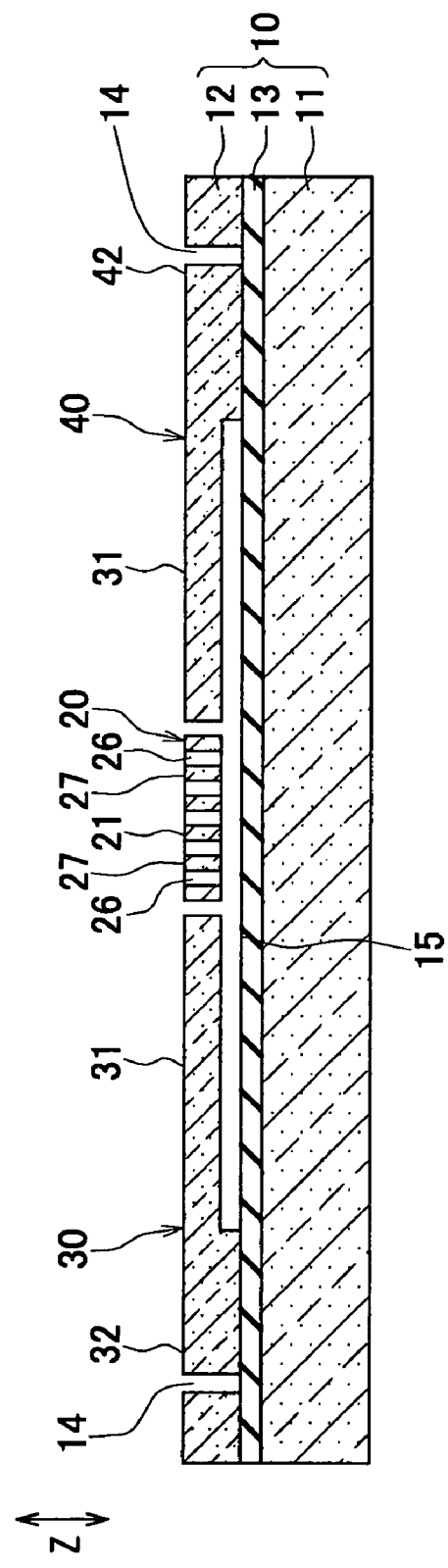
FIG. 10 is a cross sectional view showing the sensor taken along line X—X in FIG. 9.
Figure 11:
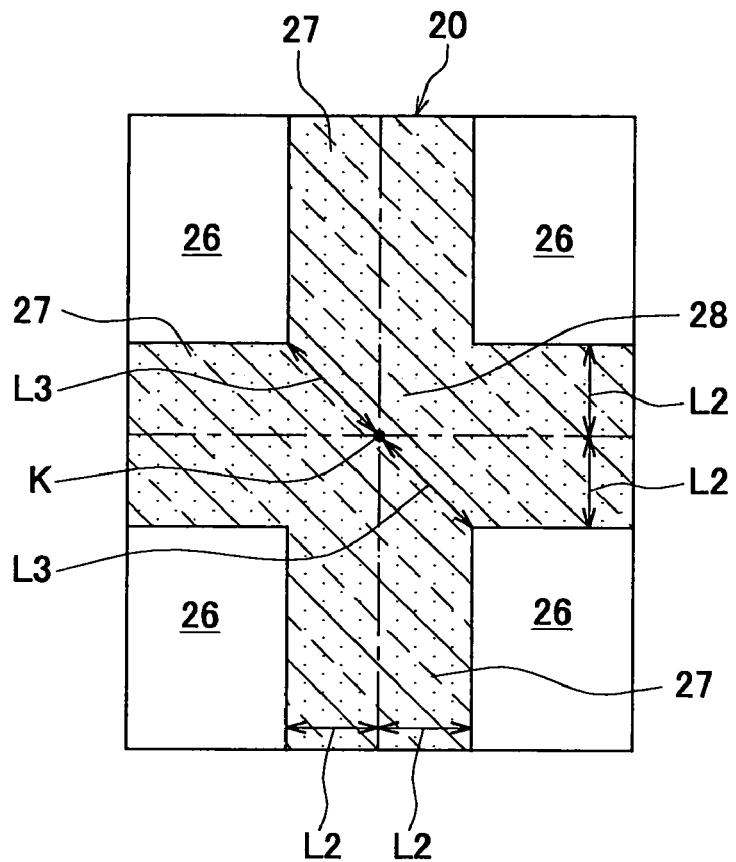
FIG. 11 is a partially enlarged plan view showing a part XI of the sensor shown in FIG. 9.

The inventors have preliminarily studied about a physical quantity sensor. FIG. 9 is a schematic plan view of the sensor. FIG. 10 is a schematic sectional view along the line X—X of FIG. 9. FIG. 11 is an enlarged view of the part XI of FIG. 9.

Such acceleration sensors are made by processing a semiconductor substrate 10 with a well-known micro-machine.

As shown in FIG. 10, the semiconductor substrate 10 of the experimental acceleration sensor is a rectangular SOI substrate 10 comprising a first silicon plate 11 as a supporting base plate, a second silicon plate 12 as a semiconductor layer, and an oxide film 13 as an insulating layer therebetween.

The second silicon plate 12 is trench-etched to form trenches 14, through holes 26, a movable part 20, and fixed electrodes 31 and 41. The movable part 20 has beam parts 22 and movable electrodes 24. The movable electrodes 24 are formed as one body with beam parts 22. The fixed electrodes 31 and 41 are arranged opposite to the movable electrodes 24.

The trench etching is made from the top-surface side of the second silicon plate 12 to form the pattern of a structure including the movable part 20. Then, the lower part of the second silicon plate 12 is removed by side etching to release the movable part 20. Because the side etching is made through the through holes 26, the etching is efficient.

Each beam part 22 is in the shape of beams extending in the direction perpendicular to the "X" direction shown in FIG. 9 and has a spring function to move in "X" direction in accordance with the application of dynamic quantity. The movable electrodes 24 are formed as one body with the beam parts 22 and disposed at intervals along the "X" direction and move in "X" direction together with the beam parts 22.

The fixed electrodes 31 and 41 are fixed onto and supported on the first silicon plate 11. The fixed electrodes 31 and 41 and the movable electrodes 24 are arranged alternately, and the side surfaces of fixed electrodes 31 and 41 and those of the movable electrodes 24 face each other.

When acceleration is applied to the acceleration sensor in the "X" direction, the capacity "CS1" between the left fixed electrodes 31 and the movable electrodes 24 and the capacity "CS2" between the right fixed electrodes 41 and the movable electrodes 24 change.

A signal based on the difference between the changed capacities (CS1−CS2) is outputted, processed by a circuit, etc. (not shown), and finally outputted. In this way, acceleration is detected.

As shown in FIGS. 9 to 11, according to such the acceleration sensor, the through holes 26 of the movable part 20 are rectangular.

There are junctions 28 of four straight parts of the hole frame 27 around the through holes 26.

As shown in FIG. 11, the distance "L3" from the perimeter to the center "K" of each junction 28 is about 1.4 times ($\sqrt{2}$ times) the distance "L2" from the periphery of each through hole 26 to the center of any straight frame part around said through hole 26. Specifically, the distance L3 is defined between the center K and a corner of the junction 28, and the distance L2 is defined between a center line and a side of the junction 28.

Even with the through holes 26 of the shape and arrangement shown in FIGS. 9 to 11, the movable part 20 can be released by etching. However, the etching time necessary to release each part of distance "L3" is 1.4 times the etching time necessary to release each part of distance "L2." Accordingly, the finished shapes of various parts of the movable part 20 vary considerably.

Besides, when we try to release the parts of distance "L3" completely, the parts of distance "L2" are overetched, and the straight parts of the hole frame 27 between the through holes 26 rendered too narrow and thin.

In view of the above problem, a physical quantity sensor according to a first embodiment of the present invention is provided. Specifically, in this embodiment, the present invention is applied to an acceleration semiconductor sensor of a differential capacity type (capacity-type acceleration sensor) as a semiconductor dynamic-quantity sensor. This acceleration sensor can be applied to acceleration sensors for automobiles and gyro-sensors for controlling the workings of air bags, ABS, VSC, etc.

Figure 1:
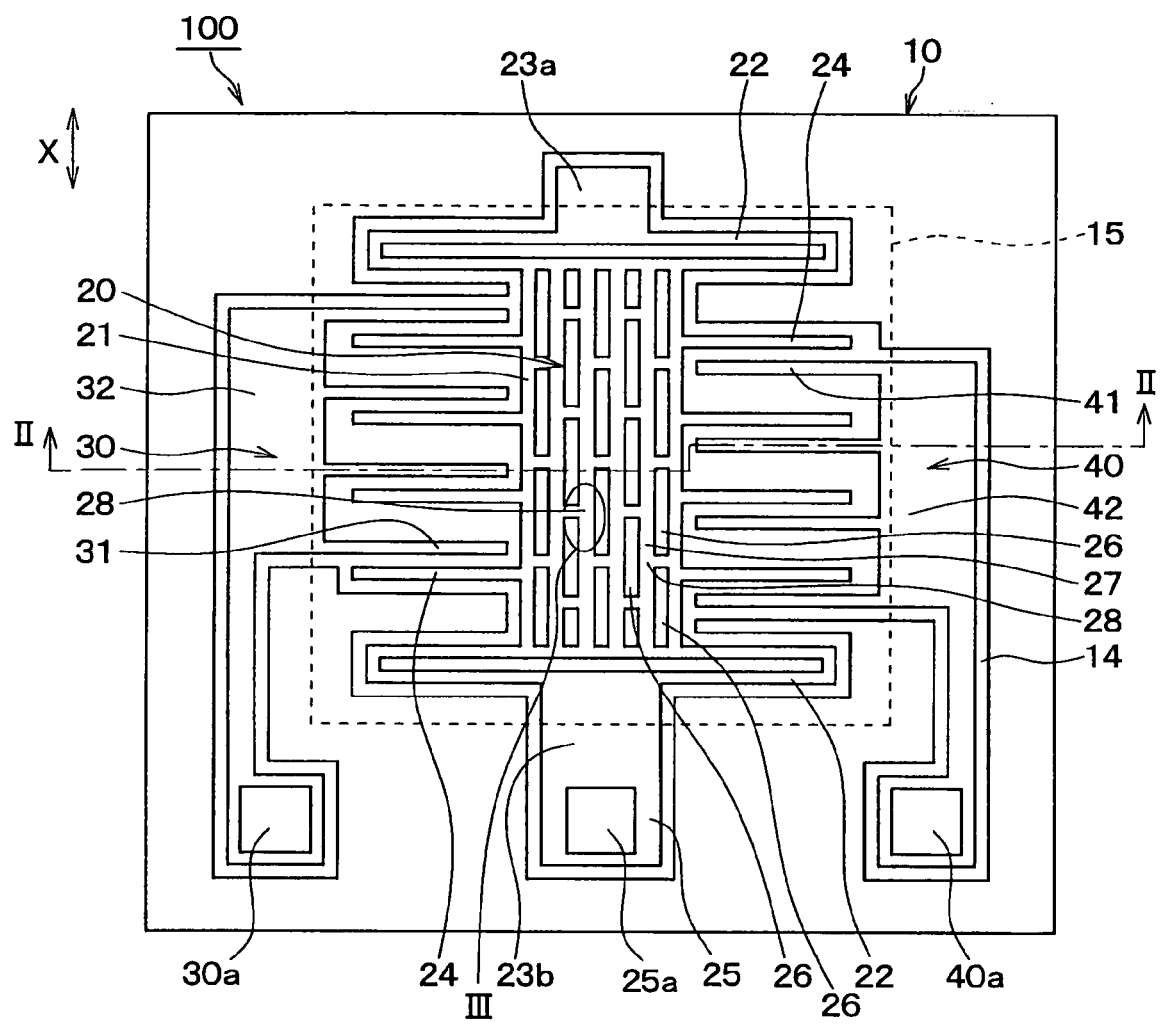
FIG. 1 is a plan view showing a semiconductor acceleration sensor according to a first embodiment of the present invention.
Figure 2:
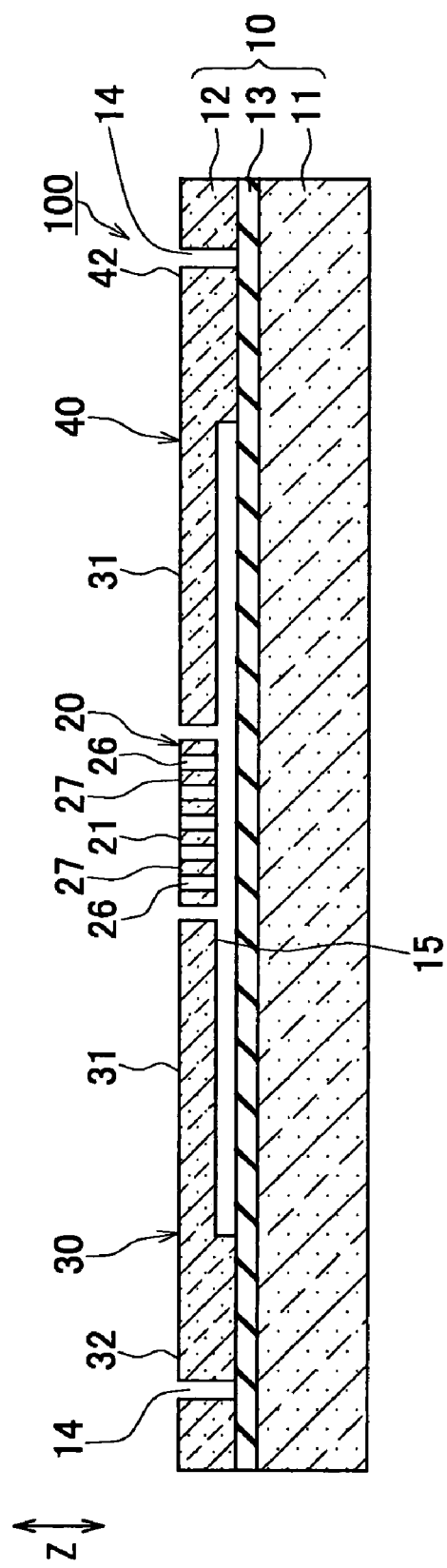
FIG. 2 is a cross sectional view showing the sensor taken along line II—II in FIG. 1.
Figure 3:
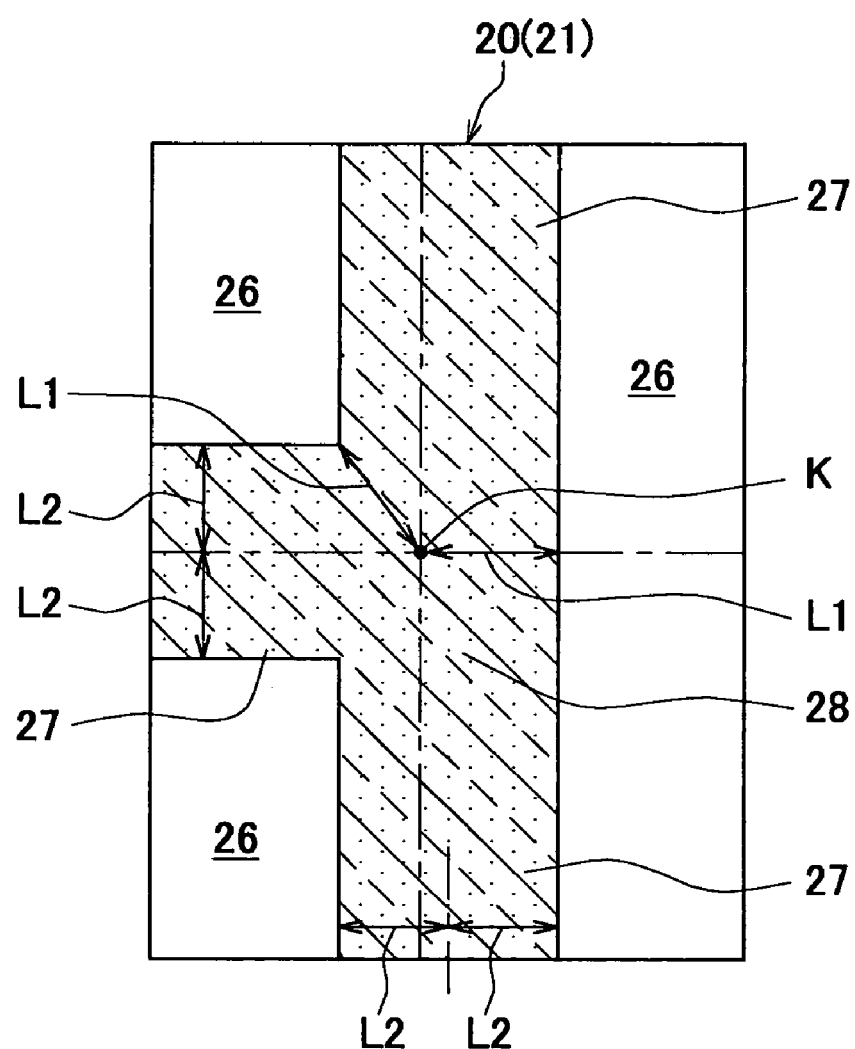
FIG. 3 is a partially enlarged plan view showing a part III of the sensor shown in FIG. 1.

FIG. 1 is a schematic plan view of an acceleration sensor 100 in accordance with the present embodiment. FIG. 2 is a schematic sectional view along the line II—II of FIG. 1. FIG. 3 is an enlarged view of the part "III" of FIG. 1.

This acceleration sensor 100 is formed by processing a semiconductor substrate 10 with a micro-machine.

As shown in FIG. 2, the semiconductor substrate 10 is a rectangular SOI substrate 10 comprising a first silicon plate 11 as a supporting base plate, a second silicon plate 12 as a semiconductor layer, and an oxide film 13 as an insulating layer therebetween.

Trenches 14 are formed in the second silicon plate 12 to form a beam structure which comprises a movable part 20 and fixed parts 30 and 40 and is in the shape of a comb's teeth.

As shown by a broken-line in FIG. 1, a rectangle part 15 of the beam structure 20-40 of the second silicon plate 12 is made thin so that there exists a gap between the thin part of the second silicon plate 12 and the oxide film 13. The part will hereinafter be called "thin part 15" of the second silicon plate 12.

The movable part 20 comprises a long, narrow rectangular weight part 21 which is connected to anchor parts 23a and 23b through the medium of a spring part as a beam part 22.

The anchor parts 23a and 23b are fixed onto the oxide film 13. Thus, they are supported on the first silicon plate 11 through the medium of oxide film 13. Accordingly, the weight part 21 and the spring part 22 are separated from the oxide film 13.

As shown in FIG. 1, the spring part 22 comprises two parallel beams, which are connected at both of their ends to have the shape of rectangular frame, and has a spring function to allow the weight part 21 to move in the direction perpendicular to the beams.

To be specific, the spring part 22 allows the weight part 21 to move in the "X" direction when the acceleration sensor 100 is exposed to acceleration containing a component in an "X" direction parallel to the semiconductor substrate 10 as shown in FIG. 1. When the acceleration ceases, the spring part 22 allows the weight part 21 to revert to its original static position.

Thus, the weight part 21, which is connected to the semiconductor substrate 10 through the medium of spring part 22, can move over the first silicon plate 11, in the "X" direction when the acceleration sensor 100 is exposed to acceleration containing a component in an "X" direction parallel to the semiconductor substrate 10.

As shown in FIG. 1, the movable part 20 has movable electrodes 24 as the thin part 15, which are a plurality of beams extending from both sides of the movable part 20 outward like the teeth of a comb.

In other words, the movable electrodes 24 are arranged at intervals along the longitudinal direction of the weight part 21 ("X" direction) and extending outward like the teeth of a comb.

In FIG. 1, four movable electrodes 24 are formed on each side of the weight part 21. Each movable electrode 24 has a rectangular cross section and is separated from the oxide film 13.

Thus, the movable electrodes 24 are formed as one body with the weight part 21 and the spring part 22; accordingly, the movable electrodes 24 can move in "X" direction parallel to the semiconductor substrate 10 together with the weight part 21 and the spring part 22.

As shown in FIGS. 1 and 2, the fixed parts 30 and 40 are fixed to the oxide film 13 on the two opposite sides of the thin part 15 other than the two opposite sides where the anchor parts 23a and 23b exist. Thus, the fixed parts 30 and 40 are supported on the first silicon plate 11 through the medium of the oxide film 13.

In FIG. 1, the fixed part 30 on the left side of the weight part 21 comprises left fixed electrodes 31 and a wiring part 32 for the left fixed electrodes 31 and the fixed part 40 on the right side of the weight part 21 comprises right fixed electrodes 41 and a wiring part 42 for the right fixed electrodes 41.

As shown in FIG. 1, the left and right fixed electrodes 31 and 41 are within the thin part 15 and the fixed electrodes and the movable electrodes are arranged alternately on both sides of the weight part 21.

As shown in FIG. 1, four pairs of fixed and movable electrodes are provided on each side of the weight part 21, and the fixed electrode 31 is disposed above the movable one in each pair on the left side of the weight part 21 and the movable electrode 41 is disposed above the fixed one in each pair on the right side of the weight part 21.

As described above, the left fixed electrodes 31 and the right fixed electrodes 41 are placed facing the movable electrodes 24, respectively, in the direction parallel to the semiconductor substrate 10. The gap between the fixed and movable electrodes of each pair is to detect capacity, the side surfaces of the electrodes facing each other being detecting surfaces.

The left fixed electrodes 31 and the right fixed electrodes 41 are electrically independent of each other. The fixed electrodes 31 and 41 are beams, which have a rectangular cross section and extend parallel to the movable electrodes 24.

The wiring parts 32 and 42 are supported on the first silicon plate 11 through the medium of the oxide film 13, and the left fixed electrodes 31 and the right fixed electrodes 41 are cantilevered by the wiring part 32 and the wiring part 42, respectively. And the left and right fixed electrodes 31 and 41 are separated from the oxide film 13.

Thus, a plurality of left fixed electrodes 31 are connected to a single wiring part 32 and a plurality of right fixed electrodes 41 are connected to a single wiring part 42.

A pad 30a for the left fixed electrodes 31 is provided at a prescribed place on the wiring part 32 and a pad 40a for the right fixed electrodes 41 is provided at a prescribed place on the wiring part 42.

A wiring part 25 for the movable electrodes 24 is formed and connected to the anchor part 23b as one body, and a pad 25a for the movable electrodes 24 is provided at a prescribed place on the wiring part 25. The pads 25a, 30a, and 40a are formed by sputtering or depositing aluminum.

Each of the pads 25a, 30a, and 40a is electrically connected to an external circuit (not shown) through a bonding wire. The external circuit includes a detecting circuit (see FIG. 5) for processing the signals outputted from the acceleration sensor 100.

In the acceleration sensor 100 of the present embodiment, a plurality of through holes 26 are made in the relatively large weight part 21 of the second silicon plate 12 as a semiconductor layer.

In the present embodiment, as shown in FIG. 3, there are junctions 28 of two or three straight parts of the hole frame 27 around the through holes 26. Namely, there are no junctions of four straight parts or more.

The through holes 26 have a rectangular cross section and are arranged in zigzag. More specifically, the through holes 26 are arranged in a plurality of rows in the longitudinal direction of the weight part 21 ("X" direction), their long sides lying in the same direction, and the through holes 26 in the adjacent rows are disposed in zigzag.

Figure 4A:
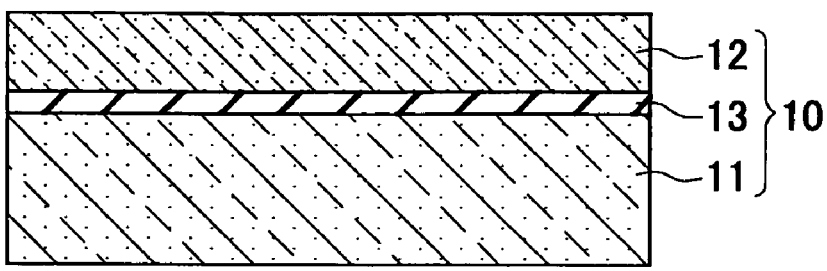
FIGS. 4A to 4C are cross sectional views explaining a method for manufacturing the sensor according to the first embodiment.
Figure 4B:
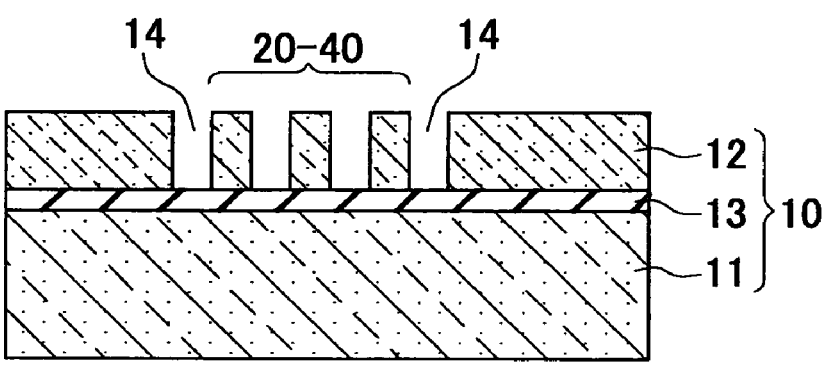
Figure 4C:
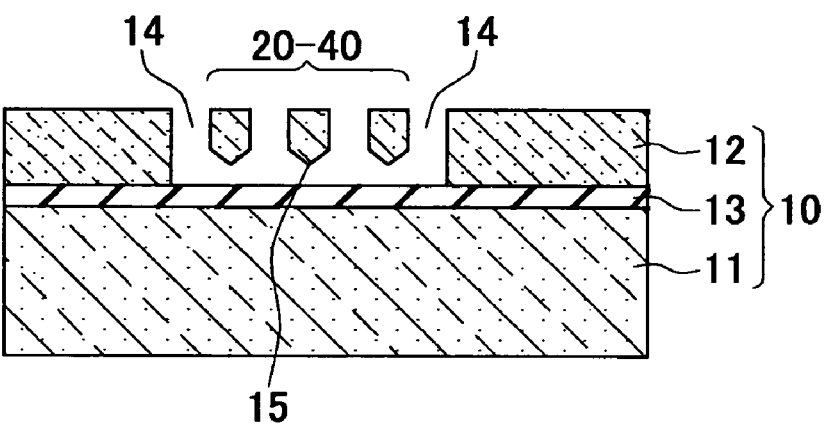

Next, the process of making the acceleration sensor 100 will specifically be described by referring to FIGS. 4A to 4C. FIGS. 4A to 4C are process drawings to show the process of making the dynamic-quantity semiconductor sensor 100 of the present embodiment.

Figure 15A:
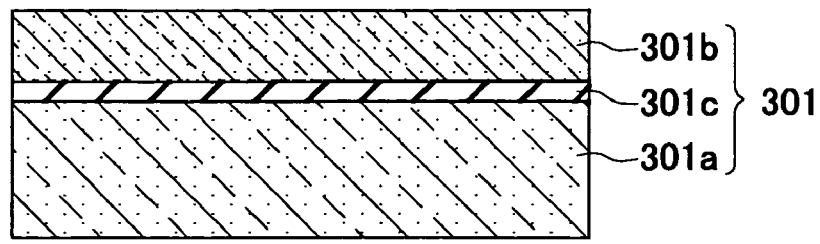
FIGS. 15A to 15C are cross sectional views explaining a method for manufacturing the sensor according to the third embodiment.

As shown in FIG. 15A, a mask, whose shape corresponds to the above beam structure 20-40, is formed of the second silicon plate 12 of the SOI substrate 10 by using the photolithography technology.

Thereafter, as shown in FIG. 4B, the second silicon plate 12 is dry-etched with a gas such as $CF_4$ or $SF_6$ to form through trenches 14 and through holes 26. Thus, the pattern of the above beam structure 20-40 is collectively formed.

Next, as shown in FIG. 4C, the lower part of the second silicon plate 12 is removed by side etching to form the thin part 15. Thus, the movable part 20 is released. In this way, the acceleration sensor 100 is made.

Because the above side, or release, etching in the weight part 21 is made through a plurality of through holes 26, the etching is made efficiently in the acceleration sensor 100 as a semiconductor device of a surface-processing type. Besides, the through holes 26 reduce the weight of the movable part 20.

Next, the working of the acceleration sensor 100 will be described below. The acceleration sensor 100 detects the applied acceleration based on the change of capacity between the movable electrodes 24 and the fixed electrodes 31 and 41 due to the application of acceleration.

As described above, the detecting surfaces of the movable electrodes 24 and those of the fixed electrodes 31 and 41 face each other and the gaps between the detecting surfaces of the movable electrodes 24 and those of the fixed electrodes 31 and 42 are to detect capacity.

A first capacity CS1 is formed between the movable electrodes 24 and the left fixed electrodes 31; a second capacity CS2, between the movable electrodes 24 and the right fixed electrodes 41.

When the acceleration sensor 100 is exposed to acceleration containing a component which is parallel to the semiconductor substrate 10 and in an "X" direction shown in FIG. 1, the weight part 21 moves in the "X" direction to cause the capacities CS1 and CS2 to change.

For example, when the weight part 21 moves downward in FIG. 1, the gaps between the movable electrodes 24 and the left fixed electrodes 31 widen and the gaps between the movable electrodes 24 and the right fixed electrodes 41 narrow.

Accordingly, the acceleration in the "X" direction is detected based on the change of the differential capacity (CS1−CS2).

To be specific, a signal based on the capacity difference (CS1−CS2) is outputted from the acceleration sensor 100, processed in the above external circuit and the like, and outputted finally.

Figure 5:
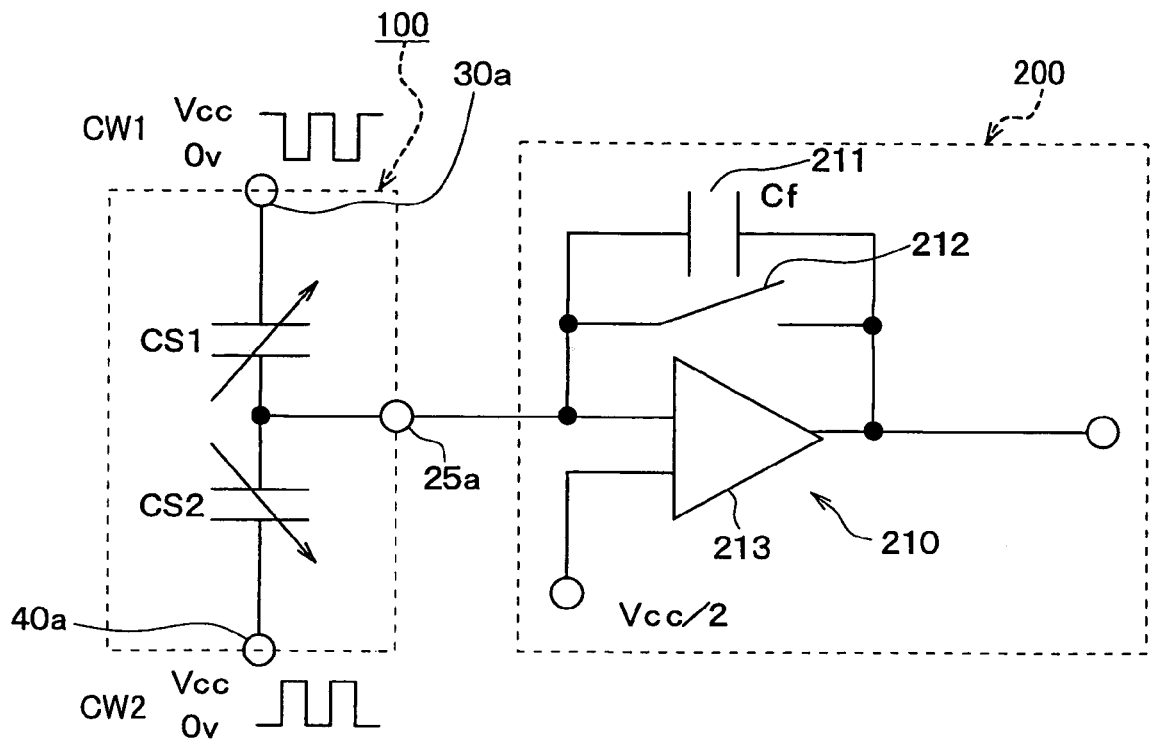
FIG. 5 is a circuit diagram showing a detection circuit of the sensor according to the first embodiment.

FIG. 5 shows a detector circuit 200 to detect acceleration at the acceleration sensor 100.

The reference numeral 210 is a switched capacitor circuit (SC circuit), which has a capacitor 211 of capacity "Cf", a switch 212, and a differential amplifier circuit 213 and converts the inputted capacity difference (CS1−CS2) into voltage.

On the other hand, a carrier wave CW1 and another carrier wave CW2 are inputted into the pad 30a and the pad 40a, respectively, of the acceleration sensor 100. The amplitude of the carrier waves CW1 and CW2 is Vcc and the phase difference between them is 180°. Then, the switch 212 of the SC circuit 210 is opened and closed at a prescribed time.

Then, a voltage value V0 representing the applied acceleration in the "X" direction is calculated through the following expression F1 and outputted.

$$V0 = (CS1 - CS2) \times Vcc/Cf \quad (F1)$$

In this way, acceleration is detected.

According to the above embodiment, the trenches 14 are formed in the second silicon plate 12 as a semiconductor layer, which is supported on the first silicon plate 11 as a supporting base plate, by etching. The trenches 14 define the movable part 20 which is released from the first silicon plate 11. A plurality of through holes 26 is made in the movable part 20 of the second silicon plate 12. And acceleration, which the acceleration sensor 100 is exposed to, is detected based on the displacement of the weight part 21 of the movable part 20. The acceleration sensor 100 is characterized by junctions 28 of two or three straight parts of the hole frame 27 around the through holes 26.

As described earlier, the junctions 28 of two or three straight parts of the hole frame 27 are accomplished by arranging the rectangular through holes 26 in zigzag.

According to the above embodiment of the present invention, the number of straight parts joining at each junction 28 is two or three, whereas the number of straight parts joining at each junction 28 is four in accordance with the sensor shown in FIG. 11. The distance from the perimeter to the center "K" of each junction 28 in accordance with the above embodiment of the present invention is shorter than that of each junction 28 in accordance with the prior art.

As shown in FIG. 11, the distance L3 from the perimeter to the center "K" of each junction 28 is about 1.4 times ($\sqrt{2}$ times) the distance L2 from the periphery of each through hole 26 to the center of any straight frame part around said through hole 26.

Accordingly, in the case of the sensor shown in FIG. 11, the time necessary to release each junction 28 is about 1.4 times the time necessary to release each straight part of the hole frame.

In the case of the above embodiment of the present invention, the junctions 28 of three straight parts of the hole frame 27 are accomplished by arranging the through holes 26 in zigzag. Accordingly, as shown in FIG. 3, the distance L1 from the perimeter to the center "K" of each junction 28 is only about 1.25 times the distance L2 from the periphery of each through hole 26 to the center of any straight frame part around said through hole 26.

The center "K" of the junction 28 means a point the distances from which to the nearest parts of the through holes around the junction are equal.

The center "K" is a point where side, or release, etching reaches last of all. When the center "K" is released, the release etching of the movable part 20 is substantially completed.

Thus, in accordance with the above embodiment of the present invention, the time necessary to release the "L1" parts is only about 1.25 times the time necessary to release the "L2" parts. Thus, the time necessary to release the movable part 20 is reduced to 0.89 (i.e., 1.25/1.4=0.89).

As described above, in accordance with the above embodiment of the present invention, the etching time necessary to release the junctions 28 is shorter as compared with that of the sensor shown in FIG. 11; therefore, the dispersion of release-etching times of movable parts 20 can be minimized.

Thus, in accordance with the above embodiment of the present invention, the movable part 20 of the acceleration sensor 100 can be released reliably and the dispersion of finished shapes of movable parts 20 can be minimized.

In the case of the above embodiment of the present invention, trench etching is made from the top-surface side of the second silicon plate 12 of the SOI substrate 10 to form the pattern of the beam structure including the movable part 20 and the lower part of the second silicon plate 12 is removed by side etching to release the movable part 20.

The present invention may be applied to an acceleration semiconductor sensor of the surface-processing type. In this case, trench etching is made from the top-surface side of the second silicon plate 12 of the SOI substrate 10 to form the pattern of the beam structure including the movable part 20 and the movable part 20 is released by making sacrifice-layer etching through the trenches and thereby removing the oxide film 13.

Besides, the present invention may be applied to angular-velocity sensors.

To sum up, the present invention provides a dynamic-quantity semiconductor sensor wherein (1) trenches are formed in a semiconductor layer, which is supported on a supporting base plate, by etching, (2) the trenches define a movable part which is released from the supporting base plate, (3) a plurality of through holes are made in the movable part of the semiconductor layer, and (4) dynamic quantity, which is applied to the dynamic-quantity semiconductor sensor, is detected based on the displacement of the weight part of the movable part. The dynamic-quantity semiconductor sensor is characterized by junctions of two or three straight parts of the hole frame around the through holes, and the design of the other parts than the junctions of the dynamic-quantity semiconductor sensor can appropriately be changed.

(Second Embodiment)

The acceleration sensor 100 of the above embodiment of the present invention is characterized mainly by the junctions 28 of two or three straight parts of the hole frame 27, which are accomplished by arranging the rectangular through holes 26 in zigzag as shown in FIGS. 1 and 3.

Figure 6:
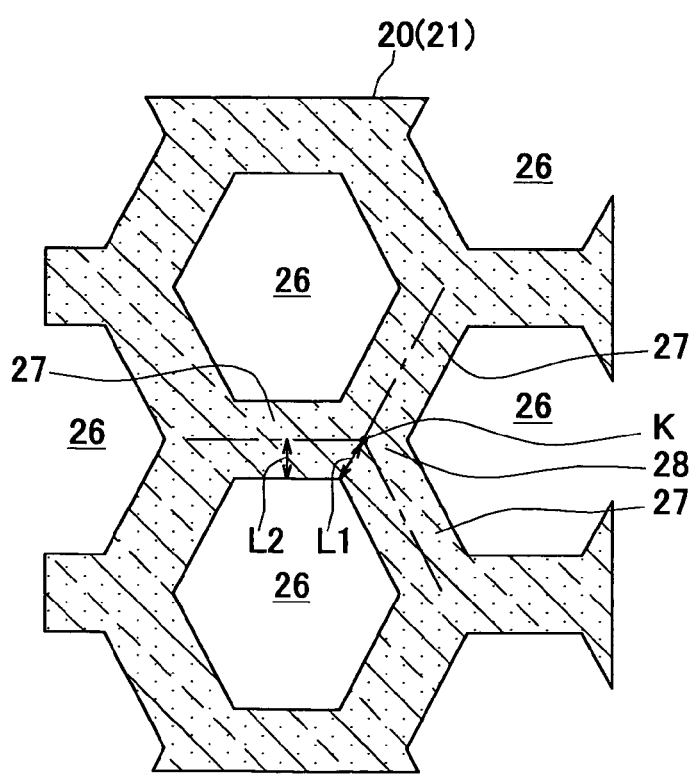
FIG. 6 is a partially enlarged plan view showing a main part of a semiconductor acceleration sensor according to a second embodiment of the present invention.
Figure 7:
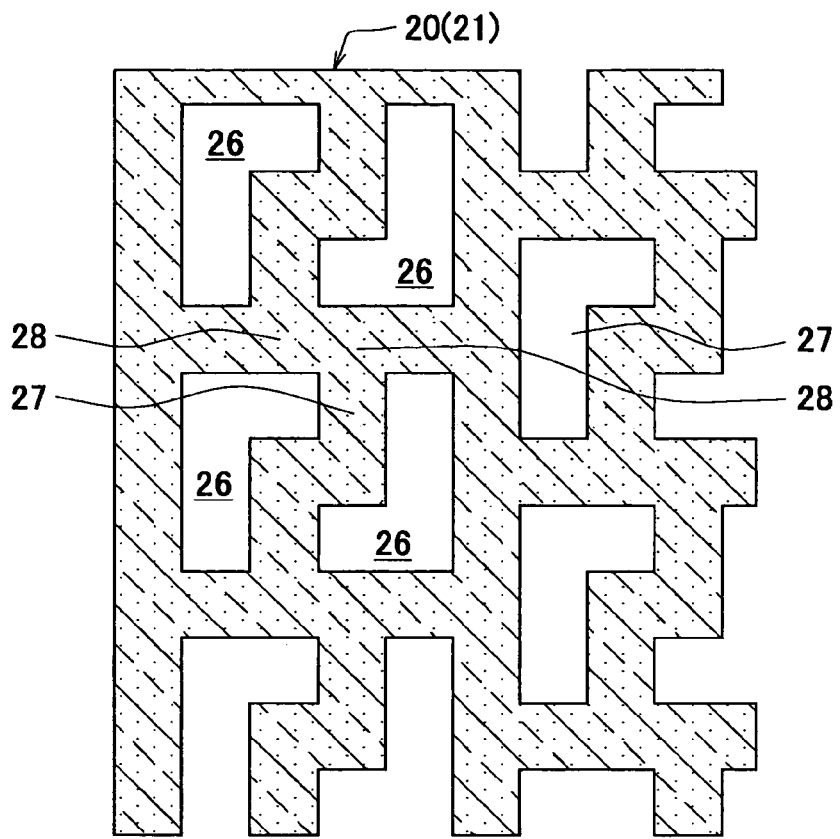
FIG. 7 is a partially enlarged plan view showing a main part of a semiconductor acceleration sensor according to a modification of the second embodiment.
Figure 8:
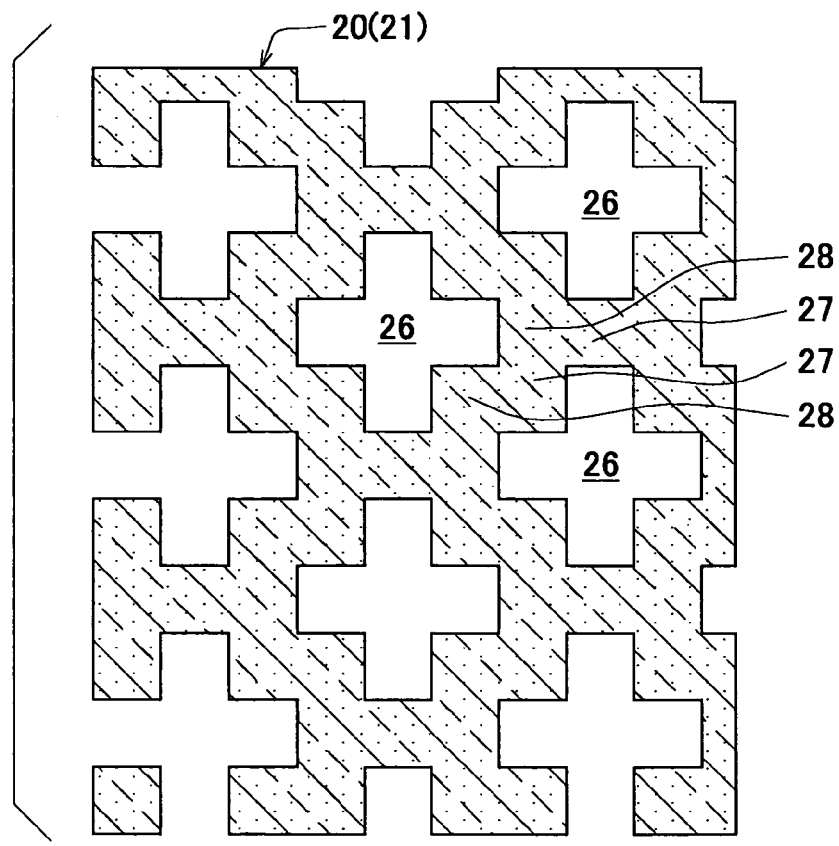
FIG. 8 is a partially enlarged plan view showing a main part of a semiconductor acceleration sensor according to another modification of the second embodiment.

Junctions 28 of two or three straight parts of the hole frame 27 can be accomplished by through holes 26 of other shapes shown in FIGS. 6 to 8.

FIG. 6 shows hexagonal through holes 26 in honeycomb-like arrangement.

In FIG. 7, junctions 28 of two or three straight parts of the hole frame 27 is accomplished by giving the shape of "L" to the through holes 26. In FIG. 8, junctions 28 of two or three straight parts of the hole frame 27 is accomplished by giving the shape of a cross to the through holes 26.

The through holes 26 of FIGS. 6 to 8 bring about the same effect as the through holes 26 of FIG. 1.

(Third Embodiment)

The inventors have further preliminarily studied about a dynamic-quantity sensor. According to the study by the inventors, it was learned that the following problem took place in the dynamic-quantity semiconductor sensor having such a movable part.

Figure 16:
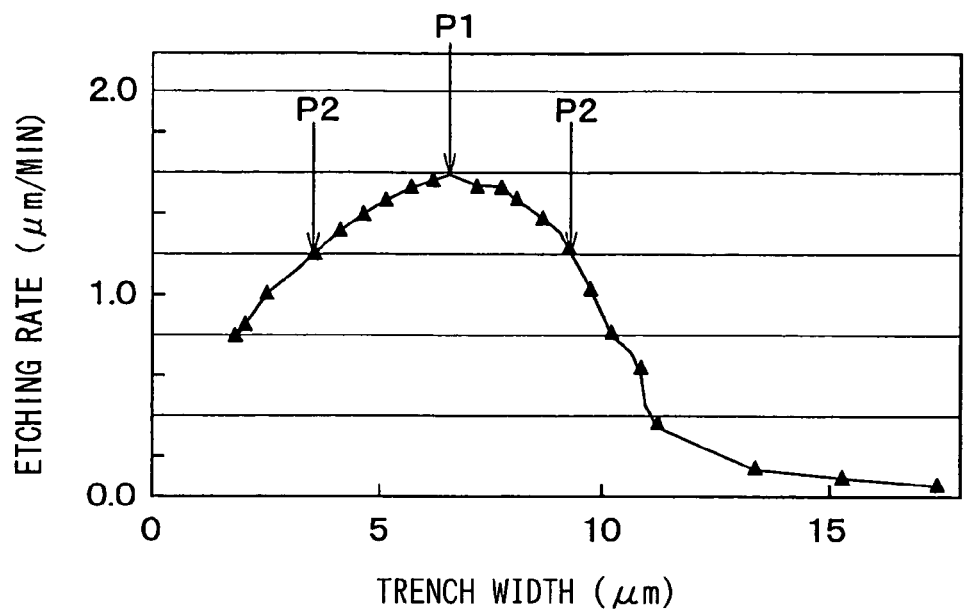
FIG. 16 is a graph showing a relationship between a trench width and an etching rate, according to the third embodiment.

Namely, it was newly discovered that in the process where trenches are made in a semiconductor layer supported on a supporting base plate by etching to form the movable part, the etching rate during the release of the movable part depended on the trench width (see FIG. 16).

Accordingly, when releasing the movable part, etching could not be proceeded with at the portion, facing the trench, of the movable part having a wide trench width, namely, a wide-gap part (for example, 20 μm wide), and the release could not be accomplished.

In view of the above problem, a dynamic-quantity sensor according to a second embodiment of the present invention is provided.

Figure 13:
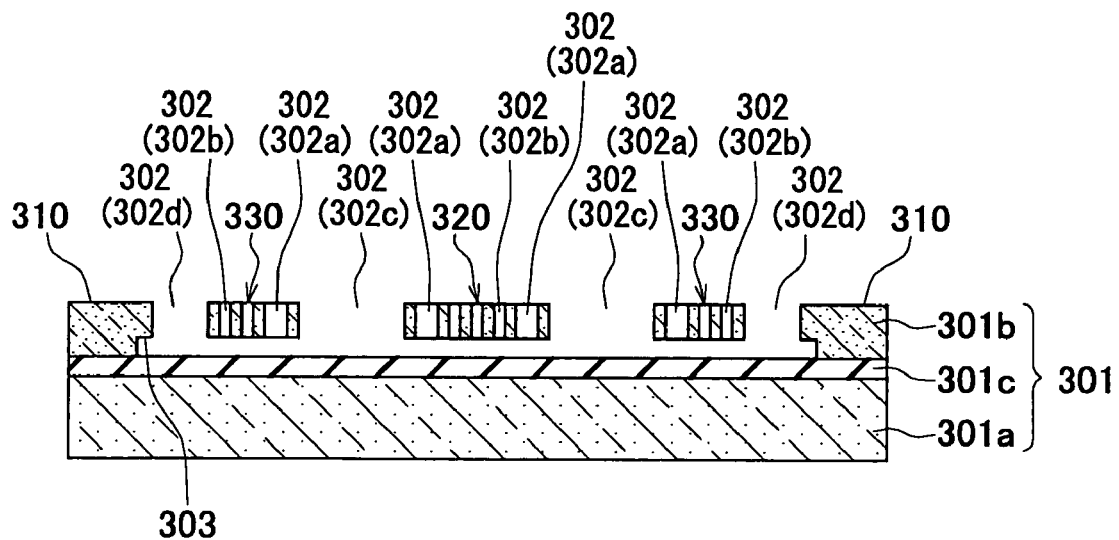
FIG. 13 is a cross sectional view showing the sensor taken along line XIII—XIII in FIG. 12.
Figure 12:
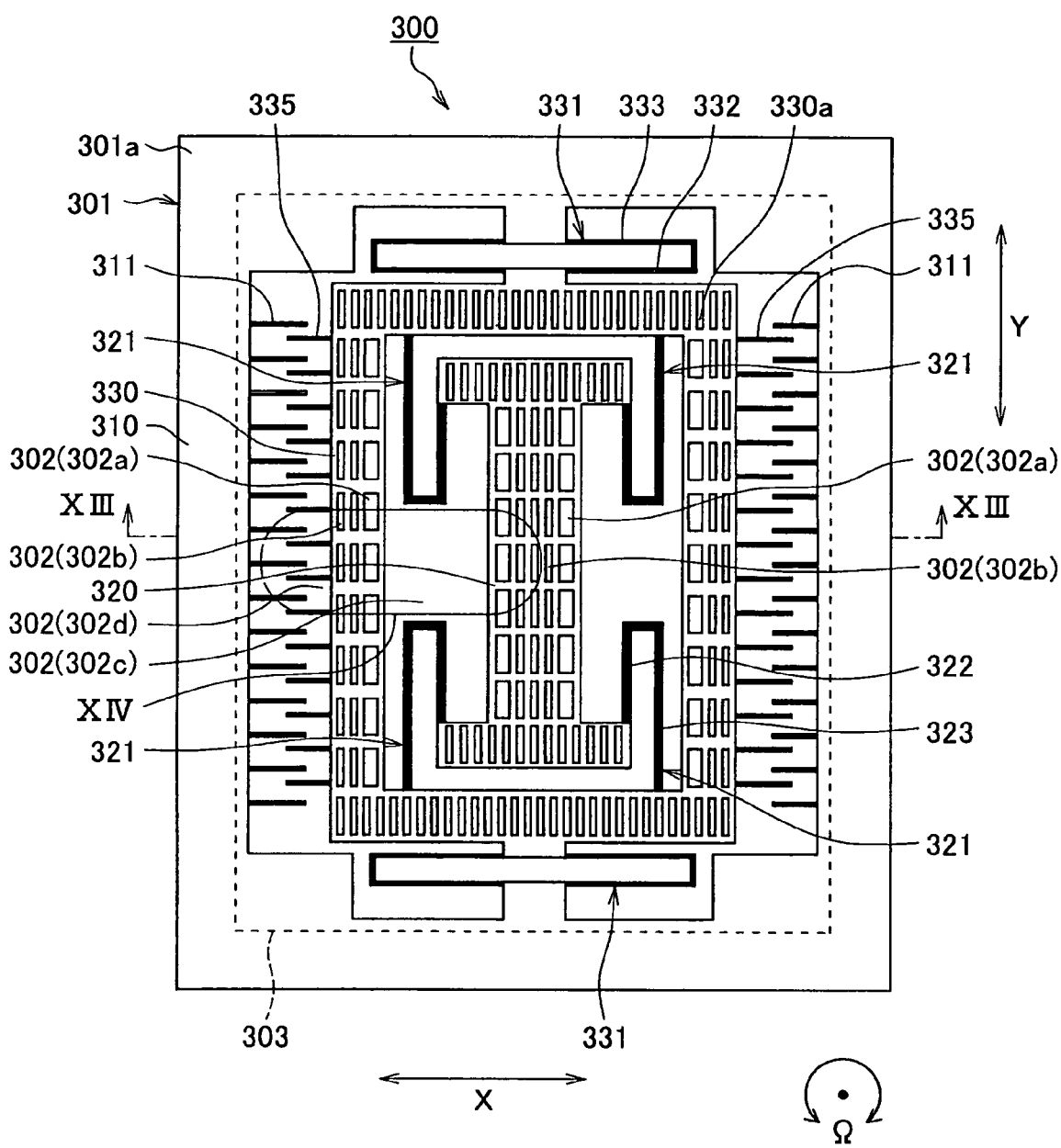
FIG. 12 is a plan view showing a semiconductor angular velocity sensor according to a third embodiment of the present invention.
Figure 14:
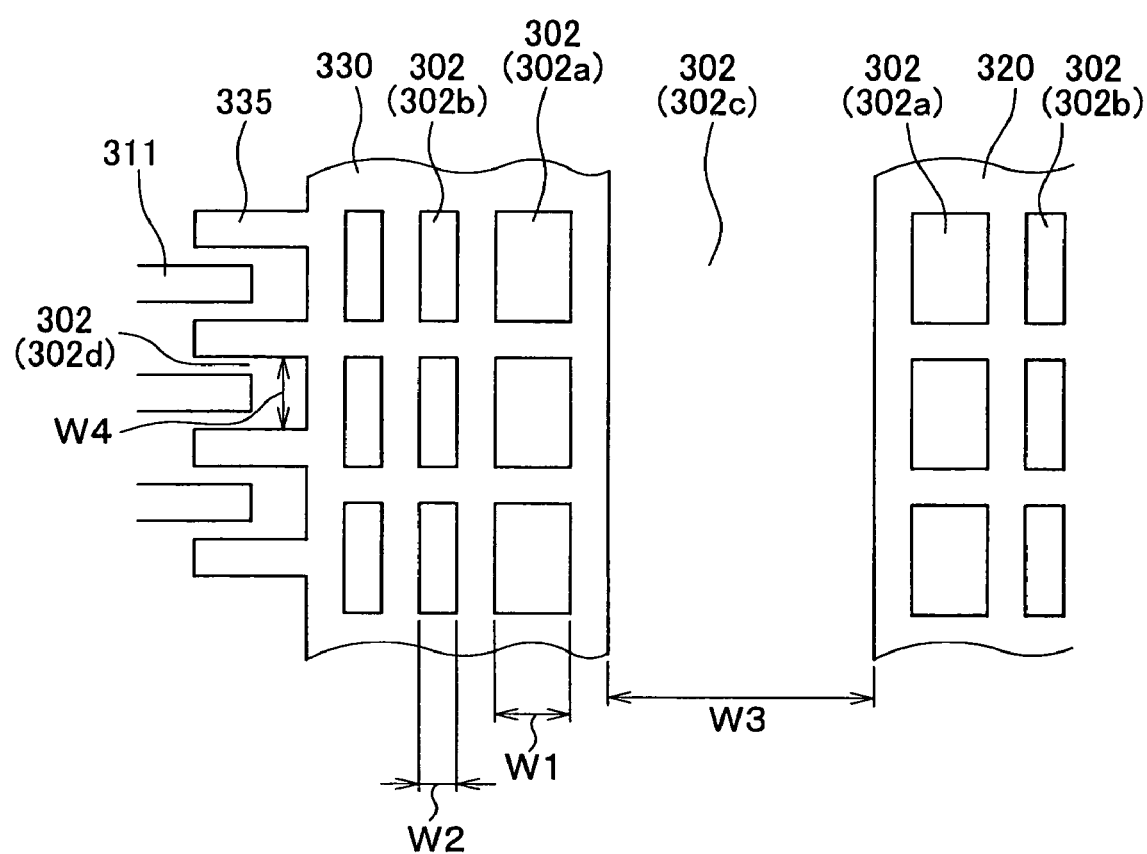
FIG. 14 is a partially enlarged plan view showing a part XIV of the sensor shown in FIG. 12.

FIG. 12 is a schematic plan view of an angular-velocity semiconductor sensor 300 as a dynamic-quantity semiconductor sensor according to an embodiment of the present invention. FIG. 13 is a schematic sectional view along the line XIII—XIII of FIG. 12. FIG. 14 is an enlarged view of the part "XIV" of FIG. 12.

This angular-velocity sensor 300 is made by processing a semiconductor substrate 301 comprising a silicon plate, etc.

To be specific, by forming trenches 302 in the semiconductor substrate 301 with a known semiconductor fabrication technology such as etching, as shown in FIG. 12, a structure comprising a frame-shaped base 310 as a fixed portion, movable parts 320 and 330 movably placed inside the frame of the base 310, etc. is defined and formed.

To be more specific, as shown in FIG. 13, the angular-velocity sensor 300 is formed, for example, by using an SOI (Silicon-On-Insulator) substrate 1 as a semiconductor substrate 301, which is made by pasting two silicon plates 301a and 301b together with an oxide film 301c therebetween.

Of the two silicon plates 301a and 301b of this SOI substrate 301, a first silicon plate 301a (the lower plate in FIG. 13) is used as a supporting base plate. Further, to a second silicon plate 301b (the upper plate in FIG. 13) as a semiconductor layer, known micro-machining such as trench etching and side etching is given from the top-surface side of the second silicon plate 301b.

With such processing, the above trenches 302 are formed in the second silicon plate 301b. Further, the structures such as the above parts 310, 320 and 330 defined by the trenches 302 are formed on the second silicon plate 301b.

In this regard, FIG. 12 shows the top-surface side of the second silicon plate 301b on which the above structures are formed, namely, the top-surface side of the semiconductor layer 301b supported on the supporting base plate 301a. Also, as shown by broken lines in FIG. 12 and FIG. 13, the portion of the second silicon plate 301b at the inner side of the base 310 is a thin part 303 which is so made as to allow a gap between itself and the oxide film 301c.

Accordingly, at the inner-side portion of the base 310, namely, at the thin part 303, the second silicon plate 301b on which the above structures are formed is released from the first silicon plate 301a, namely, the supporting base plate 301a.

Thus, according to the present example, the second silicon plate 301b is supported and fixed on the first silicon plate 301a through the medium of the oxide film 301c at the base 310, and the movable part 320 is movable being released from the first silicon plate 301a, namely, the supporting base plate 301a.

As shown in FIG. 12, the movable parts 320 and 330 comprise a generally rectangular vibration part for drive 320, a vibration part for detection 330 in the shape of a rectangular frame surrounding the vibration part for drive 320, a plurality of (in FIG. 12, four) beam parts for drive 321 joining the vibration part for drive 320 with the vibration part for detection 330, and a plurality of (in FIG. 12, two) beam parts for detection 331 joining the vibrating part for detection 330 with the base 310 surrounding it.

The vibration part for drive 320 is formed as one body with the vibration part for detection 330 through the medium of the beam part for drive 321. To be more specific, though the vibration part for drive 320 is associated with the vibration part for detection 330 and the beam part for detection 331, it is connected with the vibration part for detection 330, the base 310, and the first silicon plate 301a as a supporting base plate through the medium of the beam part for drive 321.

Each beam part for drive 321 is folded back in the shape of a U. One end of it is connected to the vibration part for drive 320 and the other end is connected to the inside surface of the vibration part for detection 330.

Further, a pair of parallel-bar portions 322 and 323 of the above U-shaped beam part for drive 321 are made so as to bend in the direction perpendicular to their longitudinal direction. Therefore, the vibration part for drive 320 can vibrate in the "X" direction shown in FIG. 12. The "X" direction will hereinafter be called "first direction X" in which the vibration part for drive 320 vibrates.

On the other hand, at each of the beam parts for detection 331, a pair of beams 332 and 333 are placed in parallel so that there is a gap therebetween, and both the ends of the beams 332 and 333 are joined to form a rectangular frame.

Then, a middle portion of the beam 332 is connected to protrusions protruding from the inside surface of the base 310 and fixedly supported on the base 310. A middle portion of the other beam 333 is connected to the vibration part for detection 330.

In other words, the vibration part for detection 330 is connected to the base 310 and the first silicon plate 301a as a supporting base plate through the medium of the beam part for detection 331.

Further, at the beam part for detection 331, the pair of parallel beams 332 and 333 described above bend in the direction perpendicular to their longitudinal direction.

Therefore, the vibration part for detection 330 can vibrate within the plane of the above base 301 in the direction perpendicular to the first direction X, which is the direction in which the vibration part for drive 320 vibrates, namely, in the "Y" direction shown in FIG. 12. The "Y" direction will hereafter be called "second direction Y" in which the vibration part for detection 330 vibrates.

Further, on the outer circumference of the vibration part for detection 330, protrusions 335 in the shape of a comb's teeth protruding toward the internal circumference of the base 310 facing the outer circumference are formed. Also, another protrusions 311 in the shape of a comb's teeth are formed on the internal circumference of the base 310. The protrusions 335 and the protrusions 311 are arranged alternately and makeup electrode parts for detection 311 and 335 of the sensor 300.

The electrode parts for detection 311, 335 and the movable parts 320, 330 are both joined to the base 310. However, since trenches (not shown) are formed in the base 310, the electrode parts for detection 311, 335 and the movable parts 320, 330 are electrically independent of each other.

Thus, in the angular-velocity sensor 300, through trenches 302 are formed in the second silicon plate 301b by etching the second silicon plate 301b as a semiconductor layer supported on the first silicon plate 301a as a supporting base plate.

The movable parts 320 and 330 released from the first silicon plate 301a are provided in the second silicon plate 301b. The movable parts 320 and 330 comprise a vibration part for drive 320 and a vibration part for detection 330.

The vibration part for detection 330 is joined to the first silicon plate 301a from the base 310 through the medium of the beam part for detection 331, which can move in the second direction Y. Also, the vibration part for drive 320 is joined to the vibration part for detection 330 through the medium of the beam part for drive 321, which can move in the first direction X.

With respect to the angular-velocity sensor 300, according to the present embodiment, as shown in FIGS. 12 to 14, besides the trenches 302 (302c, 302d) in the outer region of the movable parts 320 and 330, trenches 302 (302a, 302b) are formed in the movable parts 320 and 330, namely, in the vibration part for drive 320 and the vibration part for detection 330.

Further, in the inner region of the base 310, trenches are not formed in beams 321 and 331, whose areas are relatively small and not etched, and in the portions in the shape of a comb's teeth 311 and 335. The trenches 302a and 302b are formed in other portions whose areas are relatively large, namely, in the vibration part for drive 320 and the vibration part for detection 330.

As described above, the angular-velocity sensor 300 is made by using the first silicon plate 301a of the SOI substrate 301 as a supporting base plate and by performing trench etching and side etching from the top-surface side of the second silicon plate 301b to form movable parts 320 and 330, which are released from the first silicon plate 301a, in the second silicon plate 301b.

Therefore, according to the present embodiment, a plurality of trenches 302a and 302b are formed in the movable parts 320 and 330 where areas are large and not etched to raise the efficiency of etching and to reduce the weight of the angular-velocity sensor 300 as such a semiconductor device of the surface-processing type.

As shown in FIG. 14, according to the present embodiment, of all the trenches 302 of the sensor 300, the width W1 of the trenches 302a formed in the movable parts 320 and 330 is set such that the etching rate during the release becomes fastest.

In particular, according to the present embodiment, as shown in FIG. 14, the trenches 302c and 302d provided in the outer region of the movable parts 320 and 330 are the trench 302c of the portion whose width W3 is relatively wide and the trench 302d of the portion whose width W4 is relatively narrow.

Then, of the trenches 302a and 302b formed in the movable parts 320 and 330, the width W1 of the trench 302a formed in the portion facing the trench 302c of the portion whose width W3 is relatively wide is set such that the etching rate during the release becomes fastest in the sensor 300.

Further, of the trenches 302a and 302b formed in the movable parts 320 and 330, the width W2 of the trench 302b formed in the portion facing the trench 302d of the portion whose width W4 is relatively narrow is set such that the etching rate is slower than that of the case of the width W1 of the trench 302a formed in the portion facing the trench 302c of the portion whose width W3 is relatively wide.

Further, the width of a trench referred to in the present embodiment is the width along the direction perpendicular to the longitudinal direction of the trench, namely, so-called trench line width.

Figure 15B:
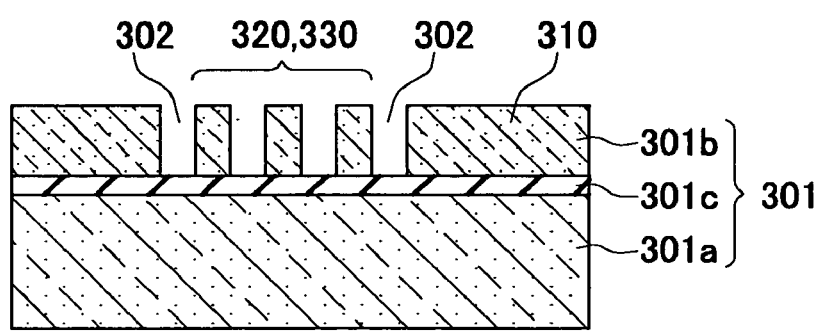
Figure 15C:
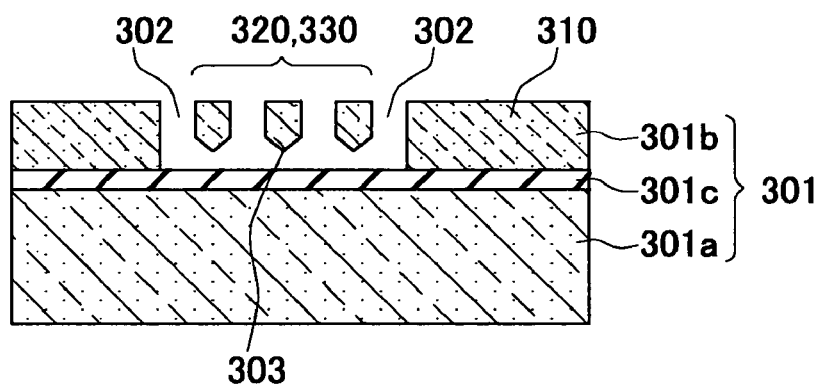

Next, the process of making the angular-velocity sensor 300 will specifically be described by referring to FIGS. 15A to 15C. FIGS. 15A to 15C are process drawings to show the process of making the angular-velocity sensor 300.

As shown in FIG. 15A, a mask, whose shape corresponds to the above structure 310–330, is formed of the second silicon plate 301b of the SOI substrate 301 by using the photolithography technology.

Thereafter, as shown in FIG. 15B, the second silicon plate 301b is dry-etched with a gas such as $CF_4$ or $SF_6$ to form trenches 302. Thus, the pattern of the above structure 310–330 is collectively formed.

Next, as shown in FIG. 15C, the lower part of the second silicon plate 1b is removed by side etching to form the thin part 3. Thus, the movable parts 320 and 330 are released. In this way, the angular-velocity sensor 300 is made.

Next, the working of the angular-velocity sensor 300 having such a configuration will be described. First, by electromagnetic drive or capacitive drive etc., the vibration part for drive 320 is vibrated (drive-vibrated) in the first direction X in FIG. 12.

Under this drive vibration, as shown in FIG. 12, when the angular-velocity sensor 300 is exposed to angular velocity Ω applied around the axis in the vertical direction in FIG. 12, namely, around the axis perpendicular to the first direction X and the second direction Y, a Coriolis force is generated in the second direction Y with respect to the vibration part for drive 320.

This Coriolis force is transmitted from the beam part for drive 321 to the vibration part for detection 330, and the vibration part for detection 330 and the vibration part for drive 320 vibrate (detection vibration) as one body in the second direction Y in FIG. 12. Due to this detection vibration, the distance between the above protrusions 311 and 335 varies. By detecting the change in the distance as variations in capacity between the protrusions 311 and 335 through the medium of a wiring part, etc. (not shown) formed on the base 310, the above angular velocity Ω is detected.

According to the present embodiment, the through trenches 302 are formed in the second silicon plate 301b, which is supported on the first silicon plate 301a, by etching. The movable parts 320 and 330 defined by the trenches 302 and released from the first silicon plate 301a are provided in the second silicon plate 301b. And angular velocity Ω, which the angular-velocity sensor 300 is exposed to, is detected based on the displacement of the movable parts 320 and 330. Of the trenches 302, the width W1 of the trenches 302a formed in the movable parts 320 and 330 is set such that the etching rate becomes fastest in the sensor 300.

The movable parts 320 and 330 are release-etched from the trenches 302 provided in the outer regions of the movable parts 320 and 330. In the present embodiment, the width W1 of the trench 302a formed in the movable parts 320 and 330 is set such that the etching rate during the release becomes fastest in the sensor 300. Therefore, the etching time for the movable parts 320 and 330 can be minimized.

Therefore, according to the present embodiment, the movable parts 320 and 330 of the angular-velocity sensor 300 can reliably be released by etching.

As described above (see FIG. 14), there are trenches 302c and 302d formed in the outer regions of the movable parts 320 and 330 of the angular-velocity sensor 300 according to the present embodiment. One of them has a relatively wide width W3 and the other of them has a relatively narrow width W3. Of the trenches 302a and 302b formed in the movable parts 320 and 330, the width W1 of the trench 302a formed in a portion facing the trench 302c having the above relatively wide width W3 is set such that the etching rate becomes fastest in the sensor 300.

Of the movable parts 320 and 330, the portion facing the trench 302c having the relatively wide width W3 is the one where the etching rate of the release is inherently slow. In the present embodiment, however, since the trench 302a has such a width W1 that the etching rate becomes fastest, appropriate release etching can be performed there, which is preferable.

Further, as described above (see FIG. 14), with respect to the angular velocity sensor 300 of the present embodiment, of the trenches 302a and 302b formed in the movable parts 320 and 330, the width W2 of the trench 302b formed in the portion facing the trench 302d having the above relatively narrow width W4 is the one whose etching rate is slower than that of the width W1 of the trench 302a formed in the portion facing the trench 302c having the above relatively wide width W3.

Of the movable parts 320 and 330, the portion facing the trench 302d having the relatively narrow width W4 is the one where the etching rate during the release is faster than that of the portion facing the trench 302c having the relatively wide width W3. However, in accordance with the present embodiment, excessive etching can be prevented at the portions facing the trenches 302d having the relatively narrow width W4 in the movable parts 320 and 330.

Figure 17:
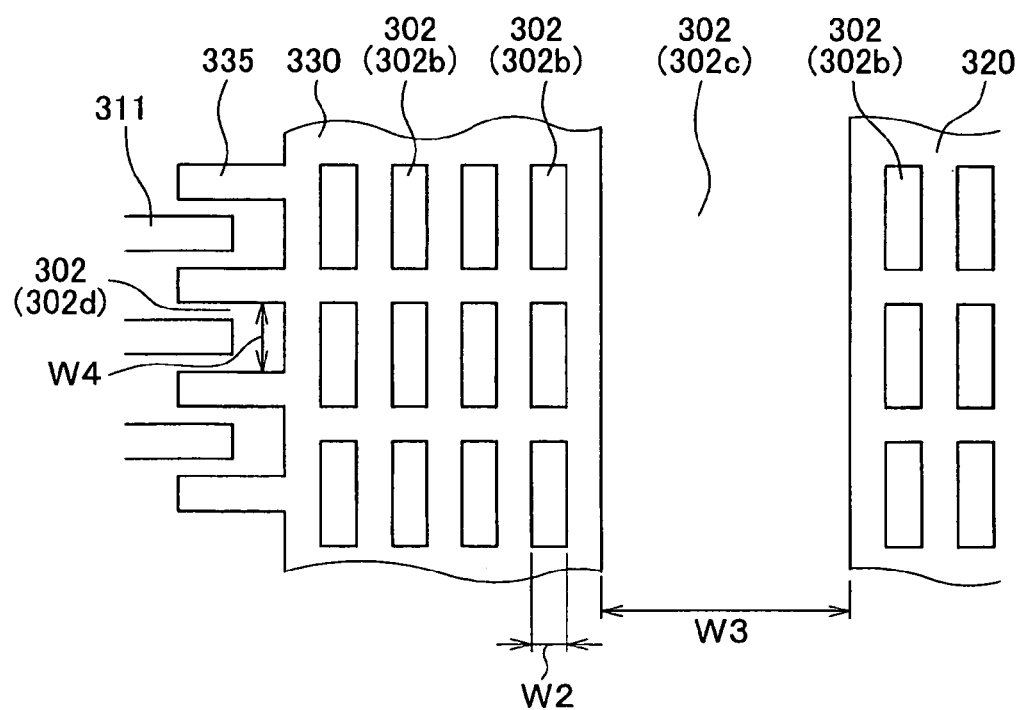
FIG. 17 is a partially enlarged plan view showing a main part of a semiconductor angular velocity sensor according to a comparison of the third embodiment.

Referring also to FIGS. 16 and 17, the above effects of the present embodiment will be described more specifically.

FIG. 16 shows the result of the research conducted by the inventor et al. with respect to the relation between the trench width (unit: μm) and the rate of release etching (unit: μm/min). Further, FIG. 17 is a plan view showing a comparative example adopting a conventional trench configuration in the angular velocity sensor 300 of the present embodiment, which is shown from the same observing point as in FIG. 14.

As shown in FIG. 16, the etching rate reaches the maximum value at a certain trench width. In this case, the etching rate reaches the maximum value when the trench width is at P1 in FIG. 16, for example, around 7 μm. After the trench width exceeding the value of about 10 μm, the etching rate is getting close to zero.

In the case of the present embodiment shown in FIG. 14, the relatively wide width W3 of the trenches 302c formed in the outer regions of the movable parts 320 and 330 is 10 μm or wider, for example, about 20 μm.

Further, of the trenches 302a and 302b formed in the movable parts 320 and 330, the width W1 of the trench 302a formed in the portion facing the trench 302c having the above relatively wide width W3 is about 7 μm, which allows the fastest etching rate.

Further, of the trenches 302a and 302b formed in the movable parts 320 and 330, the width W2 of the trench 302b formed in the portion facing the trench 302d having the above relatively narrow width W4 is the one where the etching rate is slower than that of the case of the above width W3. For example, it may be 3 μm or 9 μm, which corresponds to P2 in FIG. 16. In FIG. 14, the width W2 is about 3 μm.

In this way, according to the present embodiment, in a portion where the etching rate during the release is relatively slow in the movable parts 320 and 330, the etching time is shortened to achieve the reliable release. Also, in a portion where the etching rate is relatively fast in the movable parts 320 and 330, excessive etching can be prevented.

On the contrary, in the comparative example in FIG. 17, the widths W2 of the trenches 2b in the movable parts 320 and 330 are all substantially the same. Therefore, of the movable parts 320 and 330, at the portion facing the trench 302d having a relatively narrow width W4, reliable releasing is performed. However, of the movable parts 320 and 330, at the portion facing the trench 302c having a relatively wide width W3, some areas are not etched, which may result in incomplete releasing.

As described above, according to the present embodiment, in the angular-velocity sensor 300 as a dynamic-quantity semiconductor sensor where trenches 302 are made in the semiconductor layer 301b supported on the base plate 301a by etching to form movable parts 320 and 330, which are released from the base plate 301a, the movable parts 320 and 330 can reliably be released by etching.

According to the above embodiment, the trenches 302a having such a width W1 that allows the etching rate to be fastest in the sensor 300 are formed in the movable parts 320 and 330. However, they may be the trenches formed in the outer regions of the movable parts 320 and 330, namely, in FIG. 14, the trenches 302c and 302d that define the outside shapes of the movable parts 320 and 330.

Besides, the present invention may be applied to acceleration sensors.

To sum up, the present invention provides a dynamic-quantity semiconductor sensor wherein (1) through trenches are formed in a semiconductor layer, which is supported on a supporting base plate, by etching, (2) the trenches define a movable part which is released from the supporting base plate, and (3) dynamic quantity, which is applied to the dynamic-quantity semiconductor sensor, is detected based on the displacement of the movable part. The dynamic-quantity semiconductor sensor is characterized in that the widths of the trenches formed in the movable parts or in the outer regions of the movable parts are set such that the etching rate becomes fastest in the sensor. The design of other parts of the dynamic-quantity semiconductor sensor can appropriately be changed.

Such changes and modifications are to be understood as being within the scope of the present invention as defined by the appended claims.

What is claimed is:

1. A semiconductor physical quantity sensor comprising:
a substrate;
a semiconductor layer supported on the substrate;
a trench disposed in the semiconductor layer; and
a movable portion disposed in the semiconductor layer and separated from the substrate by the trench, wherein
the movable portion includes a plurality of through-holes, each of which penetrates the semiconductor layer in a thickness direction,
the movable portion is capable of displacing on the basis of a physical quantity applied to the movable portion so that the physical quantity is detected by a displacement of the movable portion,
the movable portion includes a center portion and a periphery portion,
the movable portion has a plurality of junctions disposed among the through-holes,
each of the plurality of junctions has a trifurcate shape at least in the center portion,
the movable portion provides a through-hole frame including a plurality of rods,
each of the plurality of junctions being formed by an intersection of a number of the plurality of rods, each of the plurality of rods having a width in a horizontal direction perpendicular to a thickness direction, and
a distance between a center of each of the plurality of junctions and a corner of a neighboring trench is smaller than ($\sqrt{2}/2$) tunes the width of each of the plurality of rods.

2. The sensor according to claim 1, wherein
each through-hole has a rectangular shape, and
the through-holes are arranged to be houndstooth check structure.

3. The sensor according to claim 1, wherein
each through-hole has a hexagonal shape, and
the through-holes are arranged to be honeycomb structure.

4. The sensor according to claim 1, wherein each of the plurality of rods is uniform in width.

5. A semiconductor physical quantity sensor comprising:
a substrate;
a semiconductor layer supported on the substrate;
a trench disposed in the semiconductor layer; and
a movable portion disposed in the semiconductor layer and separated from the substrate by the trench, the movable portion including a plurality of through-holes, each of which penetrates the semiconductor layer in a thickness direction, the movable portion capable of being displaced based on an applied physical quantity so that the applied physical quantity is detected by a displacement of the movable portion, the movable portion including a plurality of junctions that are disposed among the plurality of through-holes and that are formed by an intersection of a number of a plurality of straight parts of the movable portion, wherein
a distance between a center of each of the plurality of junctions and respective corners of neighboring trenches is smaller than ($\sqrt{2}/2$) times a width of each of the plurality of straight parts of the movable portion.

* * * * *